(12) United States Patent
Christen et al.

(10) Patent No.: US 11,030,903 B2
(45) Date of Patent: Jun. 8, 2021

(54) VEHICLE-TO-INFRASTRUCTURE COMMUNICATION

(71) Applicant: Ford Global Technologies, LLC, Dearborn, MI (US)

(72) Inventors: Erik J. Christen, Royal Oak, MI (US); Mahmoud Abdelhamid, Canton, MI (US); Pallav Sohoni, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 356 days.

(21) Appl. No.: 15/992,848

(22) Filed: May 30, 2018

(65) Prior Publication Data

US 2019/0371179 A1  Dec. 5, 2019

(51) Int. Cl.
*G08G 1/16* (2006.01)
*B60W 30/09* (2012.01)
*G05D 1/00* (2006.01)

(52) U.S. Cl.
CPC ............. *G08G 1/162* (2013.01); *B60W 30/09* (2013.01); *G05D 1/0022* (2013.01); *B60W 2554/00* (2020.02); *B60W 2556/45* (2020.02)

(58) Field of Classification Search
CPC ......... B60W 2550/00; B60W 2550/10; B60W 2550/14; B60W 2550/20; B60W 2550/30; B60W 2550/302; B60W 2550/304; B60W 2550/306; B60W 2550/308; B60W 2550/40; B60W 2550/402; B60W 2550/406; B60W 2550/408; B60W 2050/0001; B60W 2050/0002; B60W 2050/0014; B60W 2050/0089; B60W 2050/0093; B60W 2050/0098; B60W 2520/00; B60W 2520/04; B60W 2520/10; B60W 2520/12; B60W 30/02; B60W 30/08; B60W 30/09; B60W 30/095; B60W 30/0956; B60W 30/10; B60W 30/12; B60W 30/14; B60W 30/16165; B60W 30/17; B60W 30/18; B60W 30/18018; B60W 2554/00; B60W 30/186; B60W 2050/0292; B60W 2420/42; B60W 2050/52; B60W 2530/14; B60W 40/06; B60W 50/14; B60W 2556/50; B60W 2555/60; B60W 2552/05; G08G 1/16; H04L 9/10; H04L 9/32;

(Continued)

(56) References Cited

U.S. PATENT DOCUMENTS 5,572,684 A * 11/1996 Canik ................. G06F 13/4226
                                                        710/106
8,965,621 B1 * 2/2015 Urmson .................... B60T 7/22
                                                        701/23

(Continued)

FOREIGN PATENT DOCUMENTS

EP        1946283 B1     2/2012
JP     2017098794 A      6/2017

*Primary Examiner* — Anthony R Jimenez
(74) *Attorney, Agent, or Firm* — Frank A. MacKenzie; Bejin Bieneman PLC

(57) ABSTRACT

A system includes a processor and a memory. The memory stores instructions executable by the processor to specify a driving pattern including a vehicle speed and position in a lane to encode a message determined based on vehicle sensor data, and to actuate a vehicle actuator based on the encoded message.

17 Claims, 6 Drawing Sheets

(58) Field of Classification Search
CPC .......... G05D 1/00; G05D 1/02; G05D 1/0027; G05D 1/021; G05D 1/022; G05D 1/0055; G05D 1/0214; G05D 1/0276; G05D 1/0088; G05D 1/024; G05D 1/0246; G05D 1/0257; G05D 1/0274; G05D 1/0278; G01C 21/3617; G06K 9/00201; G06K 9/00805; G06K 9/00791; G06K 9/00798; G06K 9/3241; B62D 6/00; B60T 7/22; B60T 8/00; B60T 8/17; B60T 8/885; B60T 17/18; B60T 17/221; B60T 2201/022; B60T 2210/32; B60T 2210/406; B60R 2300/30; B60R 1/00; G06T 2207/10004; G06T 2207/10028; G06T 2207/30236; G06T 2207/30252; G06T 2207/3026; G06T 7/231; G06T 7/74; G06T 7/521; G06T 7/223
USPC ........................................................ 701/24
See application file for complete search history.

(56) References Cited

U.S. PATENT DOCUMENTS

| | | |
|---|---|---|
| 9,251,694 B2 | 2/2016 | Kleve et al. |
| 9,270,452 B2 | 2/2016 | Arakawa et al. |
| 9,392,452 B2 | 7/2016 | Chesnutt et al. |
| 2016/0012727 A1* | 1/2016 | Bostick .................. G08G 1/162 340/903 |
| 2016/0236638 A1* | 8/2016 | Lavie ..................... H04N 7/185 |
| 2017/0120907 A1* | 5/2017 | Wolf ........................ G08G 1/16 |

* cited by examiner

310

| SECTION 1 | | | | SECTION 2 | | | |
|---|---|---|---|---|---|---|---|
| LANE | SUB-LANE | TIME [SEC] | LETTER | LANE | SUB-LANE | TIME [SEC] | LETTER |
| 1 | TOP | 3.6 | A | 1 | TOP | 3.6 | A |
| 1 | MIDDLE | 3.6 | B | 1 | MIDDLE | 3.6 | B |
| 1 | BOTTOM | 3.6 | C | 1 | BOTTOM | 3.6 | C |
| 2 | TOP | 3.6 | D | 2 | TOP | 3.6 | D |
| 2 | MIDDLE | 3.6 | E | 2 | MIDDLE | 3.6 | E |
| 2 | BOTTOM | 3.6 | F | 2 | BOTTOM | 3.6 | F |
| 3 | TOP | 3.6 | G | 3 | TOP | 3.6 | G |
| 3 | MIDDLE | 3.6 | H | 3 | MIDDLE | 3.6 | H |
| 3 | BOTTOM | 3.6 | I | 3 | BOTTOM | 3.6 | I |
| 1 | TOP | 4 | J | 1 | TOP | 4 | J |
| 1 | MIDDLE | 4 | K | 1 | MIDDLE | 4 | K |
| 1 | BOTTOM | 4 | L | 1 | BOTTOM | 4 | L |
| 2 | TOP | 4 | M | 2 | TOP | 4 | M |
| 2 | MIDDLE | 4 | N | 2 | MIDDLE | 4 | N |
| 2 | BOTTOM | 4 | O | 2 | BOTTOM | 4 | O |
| 3 | TOP | 4 | P | 3 | TOP | 4 | P |
| 3 | MIDDLE | 4 | Q | 3 | MIDDLE | 4 | Q |
| 3 | BOTTOM | 4 | R | 3 | BOTTOM | 4 | R |
| 1 | TOP | 4.5 | S | 1 | TOP | 4.5 | S |
| 1 | MIDDLE | 4.5 | T | 1 | MIDDLE | 4.5 | T |
| 1 | BOTTOM | 4.5 | U | 1 | BOTTOM | 4.5 | U |
| 2 | TOP | 4.5 | V | 2 | TOP | 4.5 | V |
| 2 | MIDDLE | 4.5 | W | 2 | MIDDLE | 4.5 | W |
| 2 | BOTTOM | 4.5 | X | 2 | BOTTOM | 4.5 | X |
| 3 | TOP | 4.5 | Y | 3 | TOP | 4.5 | Y |
| 3 | MIDDLE | 4.5 | Z | 3 | MIDDLE | 4.5 | Z |
| 3 | BOTTOM | 4.5 | $ | 3 | BOTTOM | 4.5 | $ |

*FIG. 3*

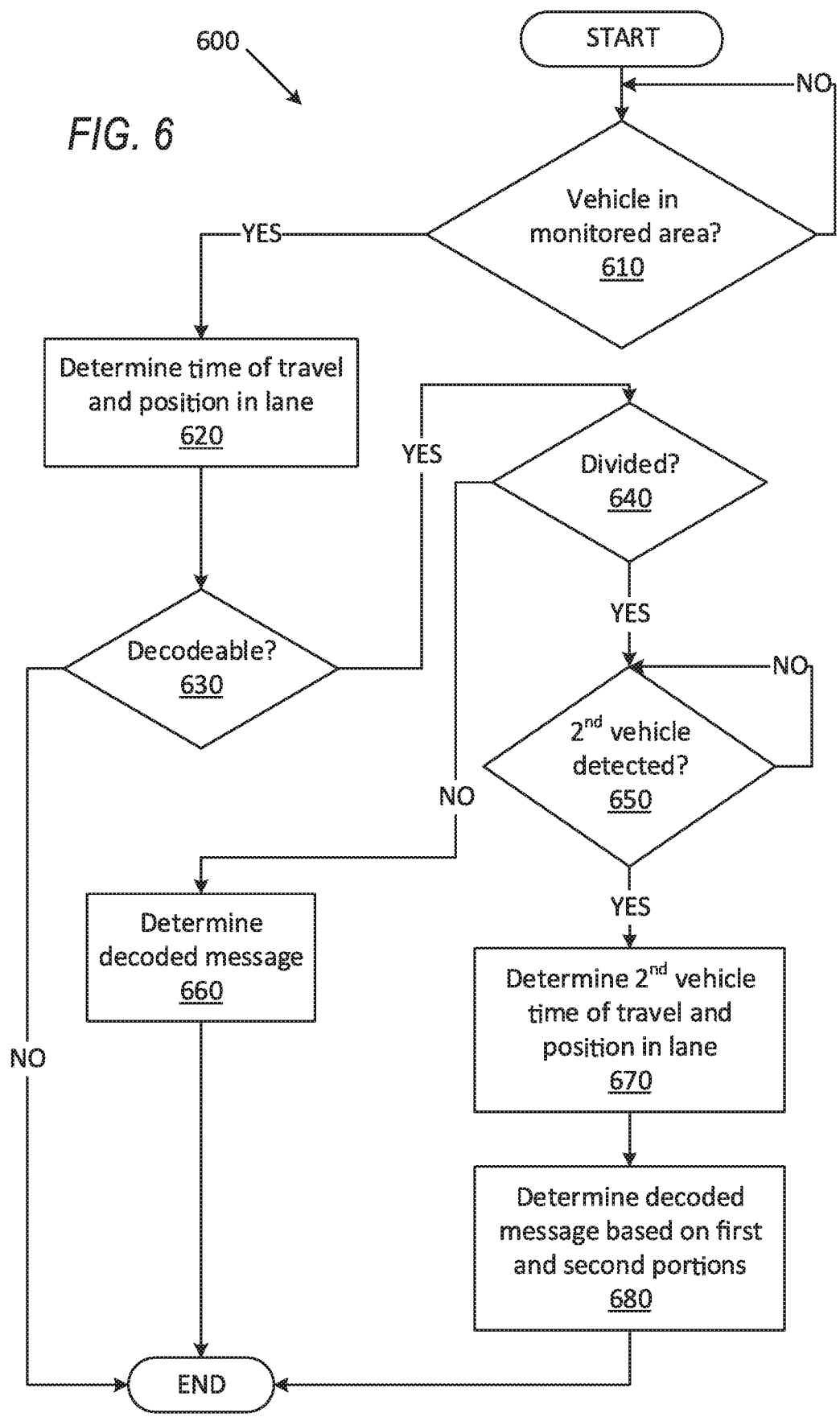

VEHICLE-TO-INFRASTRUCTURE COMMUNICATION

BACKGROUND

Control of road traffic and/or reaction to events such as infrastructure issues (e.g., a defective bridge), accidents, natural disasters, etc. may depend on information about such conditions. For example, an emergency response center computer may receive sensor data from cameras or other types of sensors mounted to the infrastructure, e.g., mounted at intersections, bridges, tunnels, etc. As another example, agents such as police officers, fire fighters, etc. may provide input to a center based on their observation of problem. However, technology to provide communications about such events or infrastructure defects may be unavailable or lack robustness. For example, existing vehicle-to-infrastructure communication systems, which may be configured to provide such data, can fail due to failures of sensors mounted to infrastructure elements, e.g., due to power failures, defective parts, etc., fatigue, etc.

BRIEF DESCRIPTION OF THE DRAWINGS

FIG. 3 is an example table used for encoding and decoding a message.

FIG. 6 is a flowchart of an exemplary process for decoding a message based on a driving pattern of the vehicle.

DETAILED DESCRIPTION

Introduction

Figure 1:
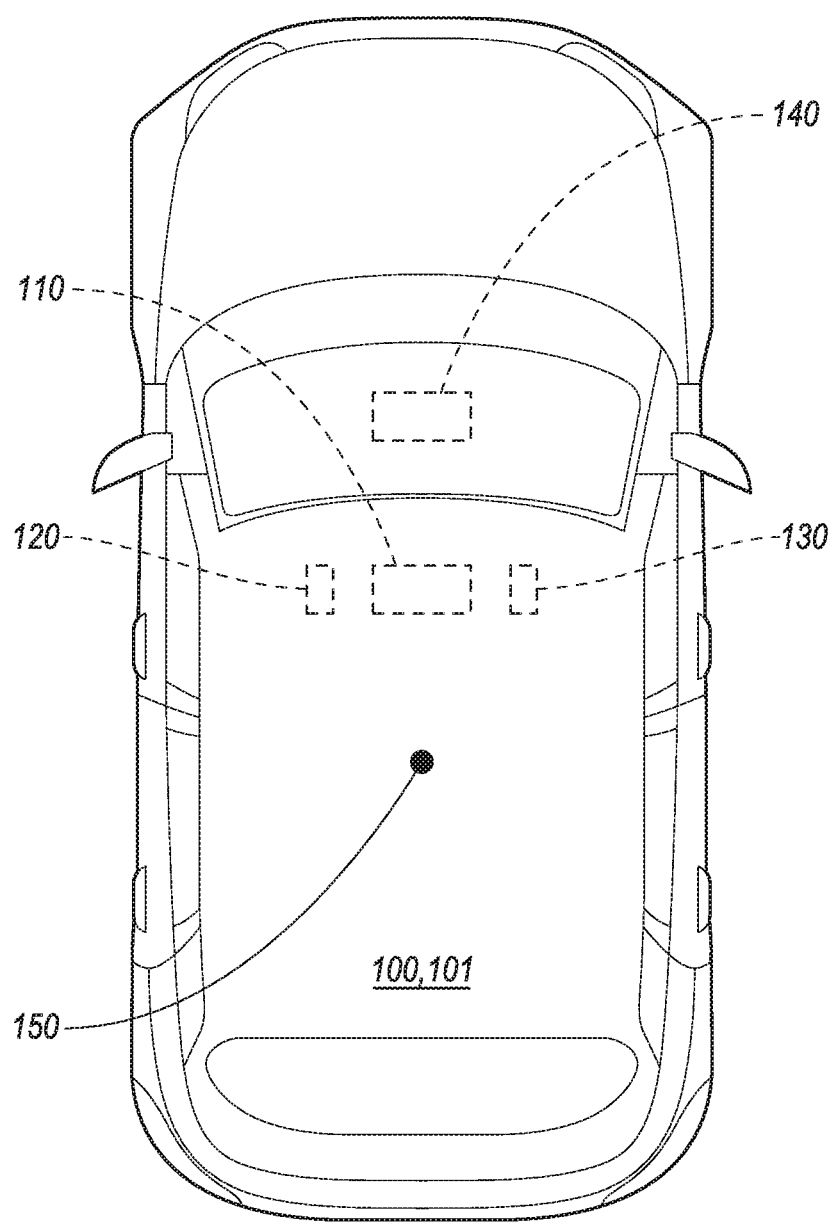
FIG. 1 is a diagram illustrating an example vehicle.

Disclosed herein is a system including a processor and a memory. The memory stores instructions executable by the processor to specify a driving pattern including a vehicle speed and position in a lane to encode a message determined based on vehicle sensor data, and to actuate a vehicle actuator based on the encoded message.

The encoded message may be based on one or more of a vehicle color and a vehicle type.

The message may include a status of at least one of an infrastructure element in an area of travel of the vehicle.

The instructions may include further instructions to receive, in addition to the vehicle sensor data, second data from a source external to the vehicle, and to determine the message based on the second data.

The instructions may include further instructions to operate the vehicle according to the driving pattern beginning at a specified start point.

The system may further include a monitoring device that includes a second computer programmed to detect the vehicle in a monitored area based on image data, to determine (a) a vehicle time of travel through a sub-area of the monitored area and (b) the position of the vehicle in the lane, and to decode the message based on the determined time of travel through the sub-area and the position of the vehicle in the lane.

The second computer may be further programmed to detect a second vehicle in the monitored area, to determine a second vehicle time of travel and a second vehicle position in the lane, and to decode the message based on (a) the determined time of travel and the position of the vehicle and (b) the second time of travel and the second position of the second vehicle.

The instructions may include further instructions to divide the message into a first part and a second part, to actuate the vehicle actuator to navigate the vehicle based on a first driving pattern included in an encoded first part of the message, and to send an instruction to a second vehicle to actuate a second vehicle actuator to navigate the second vehicle based on a second driving pattern included in an encoded second part of the message.

Further disclosed herein is a method including specifying a driving pattern including a vehicle speed and position in a lane to encode a message determined based on vehicle sensor data, and actuating a vehicle actuator based on the encoded message.

The encoded message may be based on one or more of a vehicle color and a vehicle type.

The message may include a status of at least one of an infrastructure element in an area of travel of the vehicle.

The method may further include receiving, in addition to the vehicle sensor data, second data from a source external to the vehicle, and determining the message based on the second data.

The method may further include operating the vehicle according to the driving pattern beginning at a specified start point.

The method may further include detecting, in a monitoring device, the vehicle in a monitored area based on image data, determining, in the monitoring device, (a) a vehicle time of travel through a sub-area of the monitored area and (b) the position of the vehicle in the lane, and decoding the message based on the determined time of travel through the sub-area and the position of the vehicle in the lane.

The method may further include detecting, in the monitoring device, a second vehicle in the monitored area, determining, in the monitoring device, a second vehicle time of travel and a second vehicle position in the lane, and decoding the message based on (a) the determined time of travel and the position of the vehicle and (b) the second time of travel and the second position of the second vehicle.

The method may further include dividing the message into a first part and a second part, actuating the vehicle actuator to navigate the vehicle based on a first driving pattern included in an encoded first part of the message, and sending an instruction to a second vehicle to actuate a second vehicle actuator to navigate the second vehicle based on a second driving pattern included in an encoded second part of the message.

Further disclosed herein is a system including means for specifying a driving pattern including a vehicle speed and position in a lane to encode a message determined based on vehicle sensor data, and means for actuating a vehicle actuator based on the encoded message.

The system may further include means for detecting the vehicle in a monitored area based on image data, means for determining (a) a vehicle time of travel through a sub-area of the monitored area and (b) the position of the vehicle in the lane, and means for decoding the message based on the determined time of travel through the sub-area and the position of the vehicle in the lane.

Further disclosed is a computing device programmed to execute any of the above method steps.

Yet further disclosed is a computer program product, comprising a computer readable medium storing instructions executable by a computer processor, to execute any of the above method steps.

Exemplary System Elements

Navigation of traffic and/or deployment of service vehicles, e.g., ambulance, infrastructure repair crew, fire fighters, police forces, etc. may depend on information about the infrastructure, e.g., a defective tunnel or bridge, an avalanche, etc. A vehicle computer may receive sensor information, e.g., image data including defective bridge, and encode the information in a vehicle driving pattern. The vehicle computer may navigate the vehicle based on the determined driving pattern. A monitoring device, e.g., a satellite, may detect a vehicle movement and position and decode the encoded information based on the detected movement and position of the vehicle on the road. Thus, faults, failures, defects, omissions, etc., in infrastructure devices can be addressed by the presently-disclosed technical architecture and methodology. For example, it is possible to transmit data about an infrastructure related to a roadway, traffic, etc., to an aerial device, i.e., a device above a ground surface, e.g., a satellite, unmanned aerial vehicle, etc., even when wireless communication to the aerial device fails, is unavailable, etc., and/or a sensor mounted to a fixed (i.e., not mobile) infrastructure element is available to collect information about travel infrastructure, e.g., cameras mounted at a bridge, tunnel, etc., are faulty or not available.

FIG. 1 illustrates a vehicle 100, 101 which may be powered in a variety of ways, e.g., with an electric motor and/or internal combustion engine. The vehicle 100, 101 may be a land vehicle such as a car, truck, etc. Additionally or alternatively, the vehicle 100, 101 may include a bicycle, a motorcycle, etc. A vehicle 100, 101 may include a computer 110, actuator(s) 120, sensor(s) 130, and a Human Machine Interface (HMI 140). A vehicle 100, 101 has a reference point such as a geometrical center point 150, e.g., a point at which respective longitudinal and lateral center lines of the vehicle 100 intersect. For convenience, different vehicles 100, 101 may be referred to as a "first" vehicle 100 and a "second" vehicle 101 herein.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises a plurality of devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-vehicle (V-to-V) wireless communication interface with other vehicles 100, e.g., via a vehicle-to-vehicle communication network. The V-to-V communication network represents one or more mechanisms by which the computers 110 of vehicles 100 may communicate with other vehicles 100, and may be one or more of wireless communication mechanisms, including any desired combination of wireless (e.g., cellular, wireless, satellite, microwave and radio frequency) communication mechanisms and any desired network topology (or topologies when a plurality of communication mechanisms are utilized). Exemplary V-to-V communication networks include cellular, Bluetooth, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of a vehicle 100.

The sensors 130 may include a variety of devices such as are known to provide data to the computer 110. For example, the sensors 130 may include Light Detection And Ranging (LIDAR) sensor(s) 130, etc., disposed on a top of the vehicle 100, behind a vehicle 100 front windshield, around the vehicle 100, etc., that provide relative locations, sizes, and shapes of objects surrounding the vehicle 100. As another example, one or more radar sensors 130 fixed to vehicle 100 bumpers may provide data to provide locations of the objects, second vehicles 100, etc., relative to the location of the vehicle 100. The sensors 130 may further alternatively or additionally include camera sensor(s) 130, e.g. front view, side view, etc., providing images from an area surrounding the vehicle 100.

Figure 2:
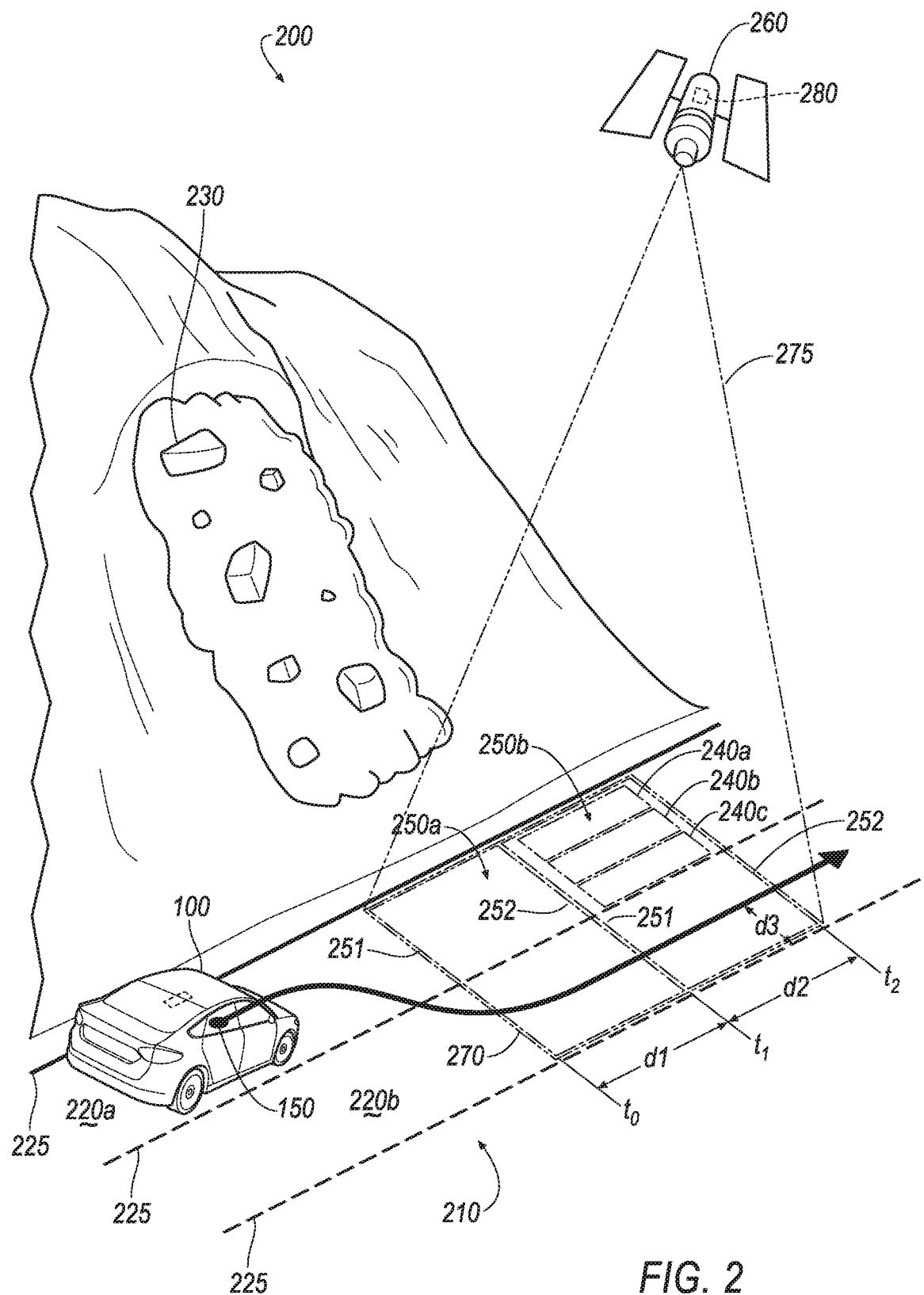
FIG. 2 is a diagram showing a driving pattern of the vehicle of FIG. 1 based on an encoded message.

For example, now referring also to FIG. 2, the computer 110 may be programmed to receive image data from the camera sensor(s) 130 and to implement image processing techniques to detect infrastructure elements 230, lane markings 225, other vehicles 100, etc. The computer 110 may be further programmed to determine a current driving lane 220a of the vehicle 100, e.g., based on detected lane markings 225. Based on data received from the sensors 130, the computer 110 may determine a relative distance, speed, etc. of elements (or objects) 230, second vehicles 100 relative to the vehicle 100.

The HMI 140 may be configured to receive input from a human operator during operation of the vehicle 100. Moreover, an HMI 140 may be configured to display, e.g., via visual and/or audio output, information to the user. Thus, an HMI 140 may be located in the passenger compartment of the vehicle 100 and may include one or more mechanisms for user input.

The computer 110 may be programmed to receive a destination, e.g., location coordinates, via the HMI 140, and to determine a route from a current location of the vehicle 100 to the received destination. The computer 110 may be programmed to operate the vehicle 100 in an autonomous mode from the current location to the received destination based on the determined route.

As illustrated in FIG. 2, the vehicle 100 computer 110 can be programmed to specify a driving pattern including a vehicle 100 speed and position in a lane 220a, 220b to encode a message determined based on vehicle 100 sensor data. The computer 110 can be further programmed to actuate a vehicle 100 actuator 120 based on the encoded message. Thus, advantageously, as described below, an aerial device 260 can include a sensor, e.g., camera, to receive the message, and then can decode the message based on image data including the vehicle 100 within a monitored area 270. An aerial device 260 typically is a mobile aerial device such as a satellite, unmanned aerial vehicle (or drone), airplane, helicopter, etc., but alternatively or additionally could include a camera mounted to a pole, building, etc. A monitored area 270 is a geographical area that encompasses one or more sub-areas 250a, 250b. The monitored area 270 is typically a part of an area included in a field of view 275 of the monitoring device 260. The monitored area 270 runs in a longitudinal direction of the road 210. Each sub-area 250 is defined by a start line 251 and an end line 252, i.e., the start line 251 identifies a boundary of the sub-area 250 that occurs first from the perspective of a direction of travel of a vehicle 100, 101 on a road 210, and the end line 252 identifies a boundary of the sub-area 250 that occurs last from that perspective.

A driving pattern, in the present context, means a set of instructions specifying respective speeds and lateral positions of the vehicle 100 within the lanes 220a, 220b of a road 210 at respective times. A driving pattern may further include a curvature (or shape) of a vehicle 100 path on a road 210, acceleration, etc. A lateral position, in the present context, is a lateral position of the vehicle 100, 101 on the road 210, i.e., a position or distance of the vehicle 100, 101 with respect to a road 210 edge and/or a marking located in a specified lane 220, e.g., measured by a line from a side of the vehicle 100, 101 to an edge (i.e., side boundary) of the road 210, the line being perpendicular to the side of the road 210. A lateral position may include a lane 220a, 220b and a sub-lane 240a, 240b, 240c. For example, the vehicle 100 position may be specified as the sub-lane 240b of the lane 240a. In one example, the computer 110 may be programmed to encode the message based on the speed and position specified in example Table 310 of FIG. 3. In one example, a lane 220a, 220b width may be divided into 3 (three) sub-lanes 240a, 240b, 240c. A width of the lane 220a, 220b may be equally divided between the sub-lanes 240a, 240b, 240c. Table 310 is an example specifying one example set of driving patterns for alphabetical characters. Similarly, driving patterns may be defined for numbers, special characters, and/or any other type of information.

The computer 110 may be programmed to receive data from the vehicle 100 sensor(s) 130, e.g., camera sensor 130, and determine the message based on the received data. The computer 110 may be programmed to determine a message including a status of an infrastructure element in an area of travel of the vehicle 100. An infrastructure element 230, in the present context, may be a bridge, a tunnel, road surface, vehicle 100, 101, etc., and/or natural features around the road 210 such as a mountain, river, vegetation, etc. For example, the computer 110 may be programmed to receive image data and to detect debris from an avalanche or rock slide posed by an infrastructure element 230, a wrecked vehicle, a flooding, etc., based on the received image data, e.g., using image processing techniques. As another example, the computer 110 may be programmed to receive image data including a bridge element and to evaluate a structural integrity of the bridge element, e.g., specified in a number between 1 (poor) to 10 (excellent), and upon determining that the specified number is less than 5 (five), to generate, e.g., a textual message including "bridge at location x is defective". In yet another example, the computer 110 may be programmed to detect a flooding, a pothole, leaking water from tunnel ceiling, etc., and to generate a message based on the data associated with the infrastructure element. The message may include textual and/or numerical data. For example, the message may include "reroute traffic away from road xy". Additionally or alternatively, the message may be selected from an example set of messages with associated meanings, e.g., that could be stored in a table or the like, e.g., message "10" could mean "flood", "20" could mean "tunnel damaged," etc. The computer 110 may be programmed to generate a message based on received sensor 130 data, e.g., programmed to detect a crack in a bridge post, and generate a message including a numerical description of defective conditions, as discussed above. In yet another example, the vehicle 100 computer 110 may be programmed to receive an instruction via a wireless communication network that includes programming for generating a message. For example, the computer 110 may be programmed to receive an instruction from a road-side wireless transmitter including to "evaluate lighting condition in tunnel," e.g., based on a predetermined vehicle-to-infrastructure communication protocol. Upon receiving the instruction from the road-side transmitter, the computer 110 may be programmed to locate the tunnel, e.g., based on location data, image data, etc., and to receive image data from inside the tunnel. The computer 110 may be programmed to determine a message including lighting condition of the tunnel based on the received image data. In one example, the computer 110 may be programmed to measure the received light intensity in the tunnel in units of lux and generate a message based on the measured light intensity, e.g., including a numerical value of the measured light intensity. In one example, a measured light intensity less than a specified threshold may indicate defective light fixtures or power outage inside the tunnel.

Additionally, the computer 110 may be programmed to receive data from a source external to the vehicle 100, e.g., a second vehicle 100, an infrastructure computer, etc., and to determine the message based on the second data. For example, a second vehicle 100 may receive sensor data from a second vehicle 100 sensor 130, e.g., via a vehicle-to-vehicle wireless communication, to determine a message based on the received sensor data, and to transmit a message to a first vehicle 100 to be transmitted via a driving pattern of the first vehicle 100. As another example, a bridge sensor may transmit data, e.g., via a wireless communication network, to the vehicle 100. The vehicle 100 computer 110 may be programmed to determine the message based on the received data, e.g., a warning message indicating a "poor" structural integrity of the bridge.

The computer 110 may be programmed to encode the message in a driving pattern by determining speed and position of the vehicle 100 based on the example Table 3. A driving pattern includes speed and lateral position of the vehicle 100 within one or more longitudinal sub-areas 250*a*, 250*b*. A sub-area 250*a*, 250*b* may have a fixed predetermined length $d_1$, $d_2$, e.g., 100 meters (m). A driving pattern of a vehicle 100 within a sub-area 250*a*, 250*b* may encode data. In one example, the speed and position of the vehicle 100 within one sub-area 250*a*, 250*b* may encode one character such as an alphabet, a number, and/or a specific message, e.g., "warning earthquake." Times shown in Table 310 are times of traveling a sub-area 250*a*, 250*b* which is dependent on the vehicle 100 speed and the length $d_1$, $d_2$ of a sub-area 250*a*, 250*b*. The bottom, middle, and top sub-lanes refer to the sub-lanes 240*a*, 240*b*, 240*c*. Although Table 310 shows distinct top, middle, bottom sub-lanes 240*a*, 240*b*, 240*c*, in other examples, the computer 110 may be programmed to encode the message in an actual value of the lateral position, a change of lateral position within a predetermined time, etc.

TABLE 1

| Speed (meter/second) | Distance (meter) | Time (seconds) |
|---|---|---|
| 22.35 | 100 | 4.5 |
| 25.03 | 100 | 4.0 |
| 27.72 | 100 | 3.6 |

An example Table 1, shows time to travel a sub-area 250*a*, 250*b* with a length of 100 meters at respective to the vehicle 100 speeds. For example, the computer 110 may be programmed to encode a message including example textual characters "XP" to the following driving pattern including (a) travel along the sub-area 250*a* within 4.5 seconds on the sub-lane 240*c*, (b) change to the sub-lane 240*a*, and then (c) travel along the sub-area 250*b* within 4 seconds. Thus, the textual information "XP" of the message can be transmitted within 200 meters (i.e., total length of the sub-areas 250*a*, 250*b*). Additionally or alternatively, the computer 110 may be programmed to encode the message based on the driving lane 220*a*, 220*b* in addition to the sub-lanes 240*a*, 240*b*, 240*c* (although not used in the example shown in Table 310). Additionally or alternatively, the computer 110 may be programmed to encode a message in more than two sub-areas 250*a*, 250*b* (see FIG. 4).

Additionally, the computer 110 may be programmed to encode the message further based on a vehicle color and/or type. For example, color and/or type of the vehicle 100 may be used to transmit larger numbers. The vehicle 100 type may include a truck, a passenger car, and/or a motorcycle. In one example, the computer 110 may be programmed to determine a multiplier based on the color of the vehicle 100. For example, the computer 110 may be programmed to use a multiplier of 2 (two) based on an orange color of the vehicle 100. Thus, to encode a numerical data "18", the computer 110 may be programmed to determine a driving pattern for the numerical data "9", and the receiver, as discussed below, may decode number 18 based on the driving pattern associated with number "9" and the orange color of the vehicle 100.

To send the encoded message, the computer 110 may be programmed to operate the vehicle 100 by actuating a vehicle 100 propulsion, steering, and/or braking actuator 120 in accordance to the determined driving pattern. The computer 110 may be programmed to detect lane markings 225, and to determine the vehicle 100 sub-lane 240*a*, 240*b*, 240*c* based on the detected lane markings 225 and predetermined ranges of the sub-lanes 240*a*, 240*b*, 240*c*.

To decode the encoded message, a monitoring device 260, e.g., a drone, a satellite, a camera mounted to a pole/building pointing toward the ground surface, etc., may include a second computer 280 that is programmed to detect the vehicle 100 in a monitored area 270 based on image data, e.g., received from a camera sensor of the monitoring device 20. The device 260 computer 280 may be programmed to determine (a) a vehicle 100 time of travel through a sub-area 250*a*, 250*b* of the monitored area 270 and (b) the position, e.g., the sub-lane 240*a*, 240*b*, 240*c*, of the vehicle 100 in the lane 220*a*, 220*b*, and to decode the message based on the driving pattern including determined time of travel through the sub-area 250*a*, 250*b* and the a succession of position of the vehicle 100 in the lane 220*a*, 220*b*. Additionally or alternatively, the computer 110 may be programmed to determine a color and/or type of the detected vehicle 100 and decode the message further based on the color and/or type of the detected vehicle 100, e.g., by applying a multiplier to the decoded message.

The monitored area 270 may include a portion of the road 210 encompassing one or more sub-areas 250*a*, 250*b*. As discussed above, the driving pattern includes time of travel. Therefore, to decode an encoded message, the monitoring device 260 may be programmed to receive data specifying a start point (a time to) of the sub-area 250*a*, 250*b*. Accordingly, the vehicle 100 computer 110 may be programmed to operate the vehicle 100 according to the driving pattern beginning at a specified start point.

Figure 4:
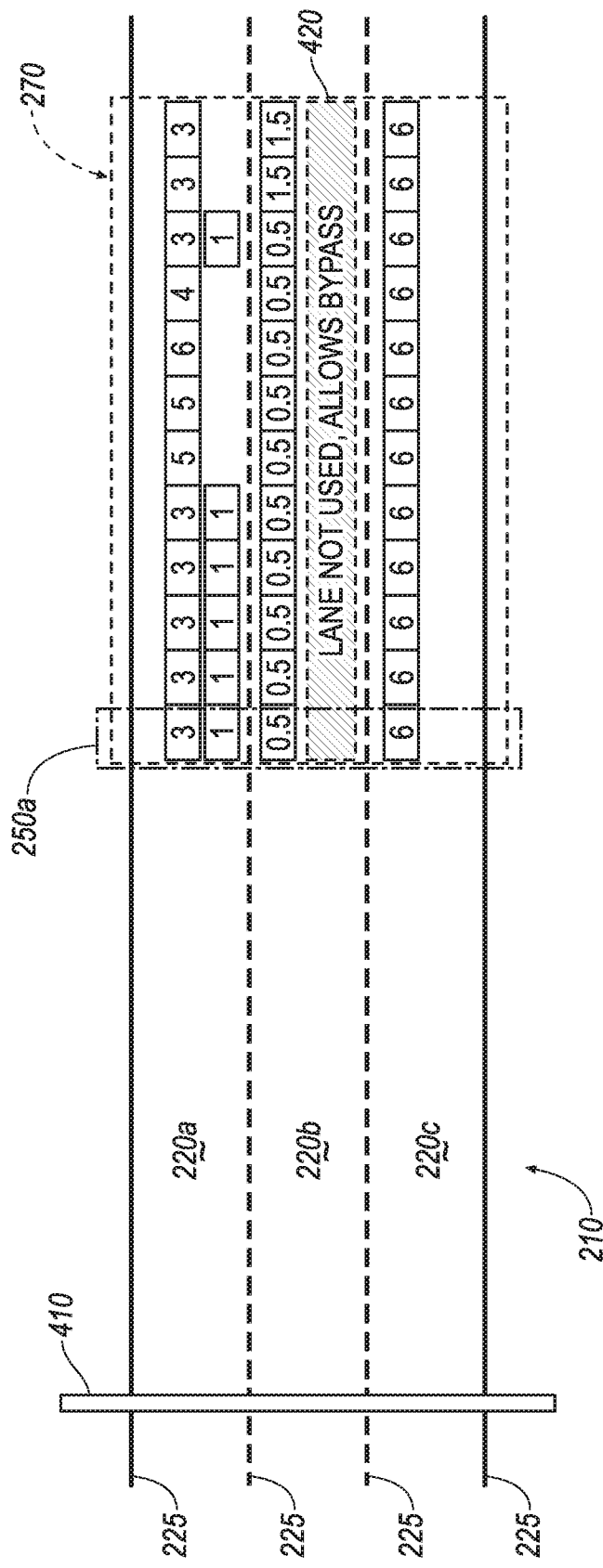
FIG. 4 is a diagram illustrating message transmission based on driving patterns of multiple vehicles.

With reference to an example shown in FIG. 4, a message may be transmitted via multiple vehicles 100, e.g., due to a volume of information included in the message. For example, a message "FIRE" may be divided into a first part "FI" and a second part "RE." Then, a first and a second vehicle 100, 101 transmit the first and second part of the message accumulatively, and the monitoring device 260 may decode the message "FIRE" based on image data including the driving pattern of the first and second vehicles 100, 101 in the monitored area 270. For example, the computer 280 may store information about the area 270 including the sub-areas 250*a*, 250*b*. In one example, the computer 280 may be programmed to concatenate characters decoded from sub-areas 250*a*, 250*b* of the area 270 in a direction of travel. In other words, the computer 280 may be programmed to decode the character, number, etc. of each sub-area 250*a*, 250*b* and string, i.e., concatenate, these together based on a detected or stored direction of travel within the area 270.

As shown in FIG. 4, an infrastructure device 410, e.g., including a wireless transmitter or a display, may transmit data indicating the start point to to the vehicles 100, e.g., via the wireless communication network, visual data on the display, etc. For example, the computer 110 may be programmed to determine a start point 300 meters after receiving a trigger, e.g., the wireless signal, the visual instruction on the display, etc., from the infrastructure device 410. Additionally or alternatively, the computer 110 may be programmed to receive a request from the infrastructure device 410 including instruction about what information is expected to be included in the message that the vehicle 100 encodes in a driving pattern. For example, the request may include: (a) evaluate the bridge/tunnel, (b) report avalanche risk, (c) repot road pothole depth and/or location, etc.

A first vehicle 100 computer 110 may be programmed to actuate the first vehicle 100 actuator 120 to navigate the first vehicle 100 based on a driving pattern that encodes a first part of the message, and to send an instruction to a second vehicle 101 to actuate a second vehicle 101 actuator 120 to navigate the second vehicle 101 based on a second driving pattern that encodes a second part of the message. Accordingly, the second vehicle 101 computer 110 may be programmed to receive the instruction from the first vehicle 100, and to actuate the second vehicle 101 based on the second driving pattern.

Additionally, the vehicle 100 computer 110 may be programmed to transmit an index with a divided message to ensure that the monitoring device 260 can concatenate the first and second part of the message in an expected way, e.g., "FIRE" instead of "REFI" with respect to above example. In one example, a first vehicle 100 may transmit a request for cooperating in sending a message via a driving pattern of vehicles 100, 101 to a second vehicle 101. In one example, upon receiving an approval from the second vehicle 101 computer 110, the first and second vehicle 100, 101 computers 110 may be programmed to determine that the second vehicle is authorized (or qualified) for cooperation in sending the message and to send an index indicating that the message is being transmitted by more than one vehicle 100, 101 and an index of the part transmitted by each vehicle 100. In another example, a device mounted to the infrastructure, e.g., a wireless transmitter mounted at a beginning of a tunnel, may transmit a wireless message to the vehicles 100, 101 that selects the first and second vehicles 100, 101 for encoding the message in driving patterns of vehicles 100, 101. With respect to above example, the first vehicle 100 may be programmed to transmit "D1FI" and the second vehicle 101 may be programmed to encode the second part to "D2IR." The Index "D1" means this is a first part of a divided message, whereas "D2RE" indicates that is a second part of the divided message. Additionally or alternatively, the computer 110 may be programmed to implement any other protocol to manage dividing messages at the transmitter side (e.g., the vehicle 100 computer 110) and retrieve the message by concatenating the received parts of the message at the receiver side, e.g., the monitoring device 260.

With reference to FIG. 4, the monitoring device 260 computer 280 may be programmed to detect a second vehicle 101 in the monitored area 270, to determine a second vehicle time of travel and a second vehicle 101 position in the lane 220*a*, 220*b*, to decode the message based on (a) the determined time of travel and the position of the first vehicle 100 and (b) the second time of travel and the second position of the second vehicle 101. As shown in FIG. 4, one or two lanes 220*a*, 220*b* and/or sub-lanes may be excluded from encoding data in the vehicles 100 driving pattern, to prevent any disruption of traffic on the road 210.

Processing

Figure 5:
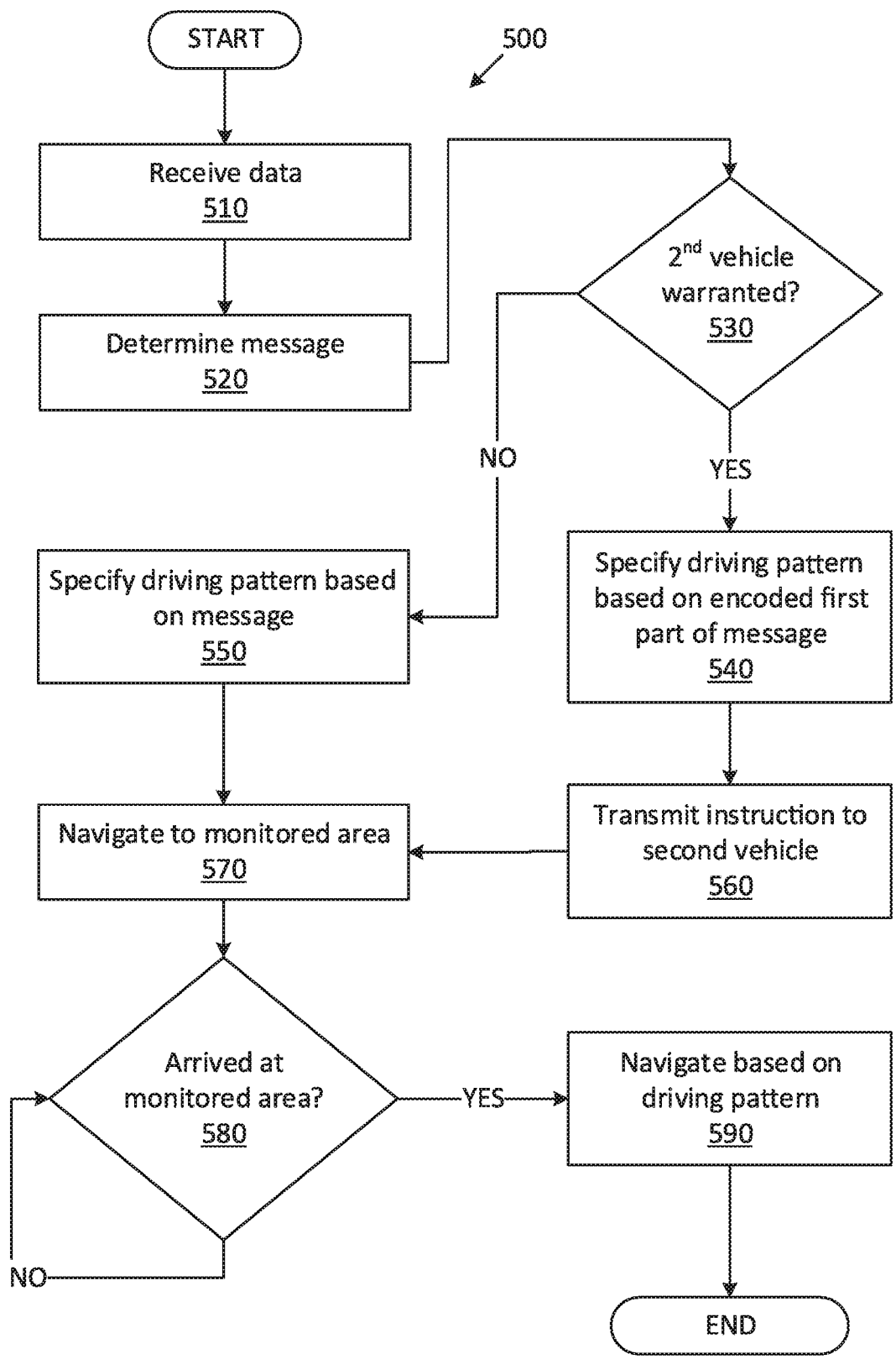
FIG. 5 is a flowchart of an exemplary process for controlling a vehicle to transmit the encoded message.

FIG. 5 is a flowchart of an exemplary process 500 for navigating the vehicle to transmit the encoded message. The vehicle 100 computer 110 may be programmed to execute blocks of the process 500.

The process 500 begins in a block 510, in which the vehicle 100 computer 110 receives data from the vehicle 100 sensors 130. For example, the computer 110 may be programmed to receive image data from a vehicle 100 camera sensor 130. Additionally, the computer 110 may be programmed to receive data from a second vehicle 101, an infrastructure device 410, etc.

Next, in a block 520, the computer 110 determines a message to be encoded in a driving pattern. The computer 110 may be programmed to determine the message based on the received sensor data, and/or an instruction received from an infrastructure device 410 and/or a second vehicle 101.

Next, in a decision block 530, the computer 110 determines whether a second vehicle 101 is authorized to transmit the determined message. For example, the computer 110 may be programmed to divide the message into multiple parts upon determining that the volume of data in the message exceeds a threshold, e.g., 2 characters. In one example, the computer 110 transmits a request to a second vehicle 101 computer to determine that the second vehicle 101 is authorized upon receiving a confirmation message from the second vehicle 101 computer 110. If the computer 110 determines that at the second vehicle 101 is warranted, then the process 500 proceeds to a block 540; otherwise the process 500 proceeds to a block 550.

In the block 540, the computer 110 divides the message into a first and a second part, and specifies a first driving pattern based on the first part. Additionally or alternatively, the computer 110 may be programmed to divide the message into more than two parts, e.g., based on the volume of data and/or availability of second vehicles 101 to transmit the parts of the message.

Next, in a block 560, the computer 110 transmits an instruction to the second vehicle 101. The computer 110 may be programmed to transmit the second part of the message to the second vehicle 101, e.g., via the wireless vehicle-to-vehicle communication network. Additionally or alternatively, the first vehicle 100 computer 110 may be programmed to determine a second driving pattern based on the second part of the message, and to transmit the second driving pattern to the second vehicle 101. Following the block 560, the process 500 proceeds to a block 570.

In the block 550, the computer 110 specifies the driving pattern based on the message.

In the block 570, following either of the blocks 550, 560, the computer 110 navigates the vehicle 100 to the monitored area 270. In one example, the computer 110 may be programmed to determine a start line 251 of the monitored area based on a trigger signal or other communication received from an infrastructure device 410 mounted on a side of the road 210, and/or based on stored information in a computer 110 memory and a vehicle 100 navigation system that determines current GPS (global position system) coordinates or the like that can be compared to coordinates in the stored information.

Next, in a decision block 580, the computer 110 determines whether the vehicle 100 has arrived at the start line 251 of the monitored area 270, e.g., at a start line 251 of the sub-area 250*a*. If the computer 110 determines that the vehicle has arrived at the start line 251 of the monitored area 270, i.e., establishes a time to, then the process 500 proceeds to a block 590; otherwise the process 500 returns to the decision block 580.

In the block 590, the computer 110 navigates the vehicle 100 based on the determined driving pattern by actuating at least one of a vehicle 100 propulsion, steering, and/or braking actuator 120. Following the block 590, the process 500 ends, or alternatively returns to the block 510 although not shown in FIG. 5.

FIG. 6 is a flowchart of an exemplary process 600 for decoding the message based on the driving pattern of the vehicle 100. The monitoring device 260 computer 280 may be programmed to execute blocks of the process 600.

The process 600 begins in a decision block 610, in which the device 260 computer 280 determines whether a vehicle 100 is detected in the monitored area 270. If the device 260 computer 280 detects a vehicle 100 within the monitored area 270, then the process 600 proceeds to a block 620; otherwise the process 600 returns to the decision block 610.

In the block 620, the device 260 computer 280 determines a time of travel and position, e.g., a sub-lane 240*a*, 240*b*, 240*c*, of the vehicle 100 within a lane 220*a*, 220*b*. In other words, the computer 280 determines a driving pattern of the detected vehicle 100.

Next, in a decision block 630, the device 260 computer 280 determines whether the detected driving pattern is decodable. The computer 280 may be programmed to determine whether the detected driving pattern matches any of the specified driving patterns, e.g., of Table 310. Additionally or alternatively, the computer 280 may be programmed to determine numerical data, alphabetical characters, other type of predetermined messages, etc. based on tables defining patterns by time to travel and lateral position of the vehicle 100, 101 in a sub-area 250*a*, 250*b*. If the computer 280 can identify a driving pattern from the Table 310 that matches the detected driving pattern, then the driving pattern is decodable, i.e., can be decoded to retrieve a message. If the computer 280 determines that the detected driving pattern is decodable, then the process 600 proceeds to a decision block 640; otherwise the process 600 ends, or alternatively returns to the decision block 610, although not shown in FIG. 6.

In the decision block 640, the computer 280 determines whether the received message is a message that was divided into multiple parts. The computer 280 may be programmed to determine that the detected driving pattern is associated with a part of a divided message, upon determining that decoded information of the driving pattern included a predetermined index. For example, the computer 280 may decode the received driving pattern and determine that the message first two characters are "S1". Based on a predetermined protocol, the computer 280 may determine that the received message a part of a divided message. If the computer 280 determines that the message is divided, then the process 600 proceeds to a block 670; otherwise the process 600 proceeds to a block 660.

In the decision block 650, the computer 280 determines whether a second vehicle 101 is detected within the monitored area 270. If the computer 280 detects a second vehicle 101, then the process 600 proceeds to a block 670; otherwise the process 600 returns to the decision block 650.

In the block 660, the computer 280 determines the decoded message, e.g., based on the example Table 310. Additionally, the computer 280 may transmit the decoded message to a remote computer, e.g., an emergency response center.

In the block 670, the computer 280 determines a time of travel and position of the second vehicle 101 in the monitored area 270.

Next, in a block 680, the computer 280 determines decoded message by concatenating the decoded first and second part of the message. The computer 280 may be programmed to decode each of the first and second parts of the message received via the first and second driving patterns of the first and second vehicles 101. Additionally, the computer 280 may be programmed to determine a decoded message that was divided to more than two parts. Additionally, the computer 280 may transmit the decoded message to a remote computer, e.g., an emergency response center.

Following the blocks 680 the process 600 ends, or alternatively returns to the decision block 610.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
a processor and a memory, the memory storing instructions executable by the processor to:
specify a driving pattern that encodes a message providing information from vehicle sensor data, the message being encoded into the driving pattern by the driving pattern including a vehicle speed and position in a lane to encode the message; and
actuate a vehicle actuator based on the specified driving pattern; and
a monitoring device that includes a second computer programmed to:
detect the vehicle in a monitored area based on image data;
determine (a) a vehicle time of travel through a sub-area of the monitored area and (b) the position of the vehicle in the lane; and
decode the message based on the determined time of travel through the sub-area and the position of the vehicle in the lane.

2. The system of claim 1, wherein the specified driving pattern is based on one or more of a vehicle color and a vehicle type.

3. The system of claim 1, wherein the message includes a status of an infrastructure element in an area of travel of the vehicle.

4. The system of claim 1, wherein the instructions include further instructions to:
receive, in addition to the vehicle sensor data, second data from a source external to the vehicle; and
determine the message based on the second data.

5. The system of claim 1, wherein the instructions include further instructions to operate the vehicle according to the driving pattern beginning at a specified start point.

6. The system of claim 1, wherein the second computer is further programmed to:
detect a second vehicle in the monitored area;
determine a second vehicle time of travel and a second vehicle position in the lane; and
decode the message based on (a) the determined time of travel and the position of the vehicle and (b) the second time of travel and the second position of the second vehicle.

7. The system of claim 1, wherein the instructions include further instructions to:
divide the message into a first part and a second part;
actuate the vehicle actuator to navigate the vehicle based on a first driving pattern included in an encoded first part of the message; and
send an instruction to a second vehicle to actuate a second vehicle actuator to navigate the second vehicle based on a second driving pattern included in an encoded second part of the message.

8. A method, comprising:
specifying a driving pattern that encodes a message providing information from vehicle sensor data, the message being encoded into the driving pattern by the driving pattern including a vehicle speed and position in a lane to encode the message;
actuating a vehicle actuator based on the specified driving pattern;
detecting, in a monitoring device, the vehicle in a monitored area based on image data;
determining, in the monitoring device, (a) a vehicle time of travel through a sub-area of the monitored area and (b) the position of the vehicle in the lane; and
decoding the message based on the determined time of travel through the sub-area and the position of the vehicle in the lane.

9. The method of claim 8, wherein the specified driving pattern is based on one or more of a vehicle color and a vehicle type.

10. The method of claim 8, wherein the message includes a status of an infrastructure element in an area of travel of the vehicle.

11. The method of claim 8, further comprising:
receiving, in addition to the vehicle sensor data, second data from a source external to the vehicle; and
determining the message based on the second data.

12. The method of claim 8, further comprising operating the vehicle according to the driving pattern beginning at a specified start point.

13. The method of claim 8, further comprising:
detecting, in the monitoring device, a second vehicle in the monitored area;
determining, in the monitoring device, a second vehicle time of travel and a second vehicle position in the lane; and
decoding the message based on (a) the determined time of travel and the position of the vehicle and (b) the second time of travel and the second position of the second vehicle.

14. The method of claim 8, further comprising:
dividing the message into a first part and a second part;
actuating the vehicle actuator to navigate the vehicle based on a first driving pattern included in an encoded first part of the message; and
sending an instruction to a second vehicle to actuate a second vehicle actuator to navigate the second vehicle based on a second driving pattern included in an encoded second part of the message.

15. A system, comprising a processor and a memory, the memory storing instructions executable by the processor to:
specify a driving pattern that encodes a message providing information from vehicle sensor data, the message being encoded into the driving pattern by the driving pattern including a vehicle speed and position in a lane to encode the message;
divide the message into a first part and a second part;
actuate the vehicle actuator to navigate the vehicle based on a first driving pattern included in an encoded first part of the message; and
send an instruction to a second vehicle to actuate a second vehicle actuator to navigate the second vehicle based on a second driving pattern included in an encoded second part of the message.

16. The system of claim 15, further comprising a monitoring device that includes a second computer programmed to:
detect the vehicle in a monitored area based on image data;
determine (a) a vehicle time of travel through a sub-area of the monitored area and (b) the position of the vehicle in the lane; and
decode the message based on the determined time of travel through the sub-area and the position of the vehicle in the lane.

17. The system of claim 16, wherein the second computer is further programmed to:
   detect a second vehicle in the monitored area;
   determine a second vehicle time of travel and a second vehicle position in the lane; and
   decode the message based on (a) the determined time of travel and the position of the vehicle and (b) the second time of travel and the second position of the second vehicle.

\* \* \* \* \*